Patented Mar. 20, 1928.

1,662,866

UNITED STATES PATENT OFFICE.

EDMUNDO ALMEIDA SALAZAR, OF MADRID, SPAIN, ASSIGNOR OF ONE-HALF TO MANUEL CONTE DE MIERES, OF MIERES DEL CAMINO, ASTURIAS, SPAIN.

SECONDARY BATTERY OR ACCUMULATOR.

No Drawing.   Application filed December 14, 1925. Serial No. 75,432.

This invention relates to a neutral system of hydroelectric elements. Amongst the acid and alkaline systems known at present is offered this new system of accumulators with a neutral electrolyte, with well-defined special features, and considerable advantages in the solution of the arduous problem of electrical generation and accumulation.

The negative electrode of this system is of metallic zinc; the positive electrode is formed essentially of silver finely pulverized, either in the form of dust imprisoned within meshes of the same metal, or else as a porous coating of silver precipitated chemically or by galvanostegy on an unattachable body, such as asbestos or, better, graphite.

The third element which specially characterizes this new system of accumulators is its electrolyte, which consists of an aqueous solution of chloride of zinc mixed with another halogenous salt, or salts, of the same metal, and to which should be added a small proportion of chlorhydric acid, to increase its conductivity and make more adhesive the deposit of zinc precipitated during the charge on the negative pole. The halogenous salts mixed with the chloride of zinc should be bromide, iodide or some other of less chemical heat of formation than that of the chloride. Let us suppose, for greater simplicity and as the most practical case, that the salt mixed with the chloride is bromide of zinc.

On charging an element of this system the bromide commences by decomposing, the bromine unites with the silver, and the zinc is deposited on the negative pole. During this phase of the charge the electro-motive power is one volt. When the bromide begins to get exhausted the decomposition of the chloride commences. The chlorine forms chlorides of silver and dislodges the bromine, which in part remains occluded and in part remains in dissolution or precipitated in the bath. So that the chloride of zinc and the bromides of silver are decomposed, the tension rises rapidly to two volts. When all the bromine has been dislodged, and the silver completely chlorinized, the third and last phase of the charge appears; the chlorine reacts with the bromine, forms chlorides with it, and remains mixed with it in the electrolytic bath, causing the electro-motive power to rise and remain at two volts and two tenths. When all the bromine is saturated with chlorine, and the latter commences to bubble visibly round the positive pole, the charge has finished and the voltage continues at two and two-tenths.

The discharge of the accumulator is absolutely identical, but is effected in inverted order. It presents a first and prolonged phase during which the tension is maintained at two volts and two-tenths, chloride of zinc being formed at the expense of the chlorine united to the bromine. Afterwards the chlorine of the chlorides of silver commences to come into action, and this in its turn is replaced by the bromine, the tension falling to two volts. Finally, bromide of zinc is formed, the bromine of the bath becoming exhausted and the bromides of silver decomposing.

The superiority of this system is shown, above all, in what refers to its electro-motive power; the latter is maintained practically equal in the charge and in the discharge, and is, besides, superior to the tension of the usual systems. To this elevated electro-motive power is united a specific capacity which can pass practically the half kilowatt-hour per kilogram, and which places this system of accumulators far above all the systems hitherto conceived or employed. For besides the fact that the bromine or iodine can accumulate to an unlimited extent, either in solution or precipitated, and besides the fact that the chlorine produces an equilibrium with the water and the other halogens by means of which it is retained in a very elevated proportion, the silver in a state of extreme pulverization and as anode has the property of absorbing practically unlimited quantities of the halogens, which on being occluded in it produce an ascending series of fixed reactions, followed by solid solutions with progressive richness of the imprisoned halogen.

As may have been observed, when this system of accumulators is carried out in its integrity, the halogens and their unstable combinations are dissolved in the electrolyte; and, as their contact with the zinc may produce parasitic reactions in an open circuit, it is advisable to surround the negative electrodes with a diaphragm, which may be of asbestos impregnated with cement or simply artificial parchment.

Finally, we would observe that not all the active elements necessary for the working of the accumulator remain immovable on the electrodes, where on the other hand they must necessarily operate; part of the halogens separate themselves from the positive pole. In this system there is given to that basic problem an original solution which opens a new horizon: all the active elements do not remain adhering to the positive pole, but are united to it by means of the absorbing attraction of the silver sponge, which incorporates them with itself with such rapidity, in the measure that it requires them, that not even intense discharges succeed in discovering fatigue in the accumulator, which always works with the external surface of its electrodes, and which admits without any deterioration discharges in short circuit.

Having now described my invention, what I claim is:

1. A secondary battery or accumulator in which the electrolyte consists of a solution of chloride of zinc copulatively mixed with another halogen salt of the same metal and of a character having less chemical heat of formation than that of the chloride.

2. A secondary battery or accumulator in which the electrolyte consists of a solution of chloride of zinc copulatively mixed with zinc bromide.

3. A secondary battery or accumulator in which the electrolyte consists of a solution of chloride of zinc copulatively mixed with another halogen salt of the same metal and of a character having less chemical heat of formation than that of the chloride, and containing a small proportion of hydrochloric acid.

4. A secondary battery or accumulator of the character set forth in claim 1, wherein the positive electrode comprises an unattackable conductor carrying an active material consisting of finely divided pure silver.

5. A secondary battery or accumulator of the character set forth in claim 1, wherein the positive electrode comprises pure silver sponge united to an unattackable conductor.

6. A secondary battery or accumulator of the character set forth in claim 1, wherein the positive electrode comprises graphite and pure silver combined therewith.

7. A secondary battery including a negative electrode of zinc, a positive electrode comprising an unattackable conductor carrying an active material consisting of finely divided pure silver, and an electrolyte consisting of a solution of chloride of zinc copulatively mixed with a halogen salt of the same metal.

8. A secondary battery including a negative electrode of zinc, a positive electrode comprising an unattackable conductor carrying an active material consisting of finely divided pure silver, and an electrolyte consisting of a solution of chloride of zinc copulatively mixed with zinc bromide.

9. A secondary battery including a negative electrode of zinc, a positive electrode comprising an unattackable conductor carrying an active material consisting of sponge silver, and an electrolyte consisting of a solution of chloride of zinc copulatively mixed with a halogen salt of the same metal.

10. A secondary battery including a negative electrode of zinc, a positive electrode comprising an unattackable conductor carrying an active material consisting of sponge silver, and an electrolyte consisting of a solution of chloride of zinc copulatively mixed with zinc bromide.

In testimony whereof I affix my signature.

EDMUNDO ALMEIDA SALAZAR.